(12) United States Patent
Takahashi et al.

(10) Patent No.: US 11,878,747 B2
(45) Date of Patent: Jan. 23, 2024

(54) SPEED REDUCER, DRIVE UNIT AND STEERING ASSISTING DEVICE

(71) Applicant: NABTESCO CORPORATION, Tokyo (JP)

(72) Inventors: Masahiro Takahashi, Tokyo (JP); Yuto Nakai, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 251 days.

(21) Appl. No.: 17/407,709

(22) Filed: Aug. 20, 2021

(65) Prior Publication Data
US 2022/0063709 A1 Mar. 3, 2022

(30) Foreign Application Priority Data

Aug. 31, 2020 (JP) .................................. 2020-146279

(51) Int. Cl.
*B62D 5/04* (2006.01)
(52) U.S. Cl.
CPC ........... *B62D 5/046* (2013.01); *B62D 5/0409* (2013.01)
(58) Field of Classification Search
CPC ............................. B62D 5/046; B62D 5/0409
See application file for complete search history.

(56) References Cited

U.S. PATENT DOCUMENTS

| 7,811,193 | B2* | 10/2010 | Nakamura | ................. F16H 1/46 |
| | | | | 475/179 |
| 8,858,383 | B2* | 10/2014 | Nishioka | ................... F16H 1/32 |
| | | | | 475/170 |
| 9,435,399 | B2* | 9/2016 | Akami | ................... F16H 57/021 |
| 2019/0162281 | A1* | 5/2019 | Nakamura | ................. F16H 1/32 |
| 2022/0063708 | A1* | 3/2022 | Takahashi | ................. F16H 1/32 |

FOREIGN PATENT DOCUMENTS

JP 2013-035475 A 2/2013

* cited by examiner

*Primary Examiner* — Jacob D Knutson
(74) *Attorney, Agent, or Firm* — Pillsbury Winthrop Shaw Pittman, LLP (57) ABSTRACT

A speed reducer includes an input rotating body, a base block, a speed reducing mechanism unit and a tubular case. The input rotating body is rotatable when acted upon by power from a drive device. The base block supports the input rotating body rotatably. The speed reducing mechanism unit reduces a speed of rotation of the input rotating body. The tubular case externally covers the speed reducing mechanism unit and the base block. The tubular case is assembled onto the base block such that they are rotatable relative to each other. The speed-reduced rotation from the speed reducing mechanism unit is output from one of the tubular case and the base block. The base block has a fixture flange integrally formed therewith. The flange extends from a radially inner region within the tubular case radially outward beyond an outer peripheral surface of the tubular case.

6 Claims, 6 Drawing Sheets

SPEED REDUCER, DRIVE UNIT AND STEERING ASSISTING DEVICE

CROSS-REFERENCE TO RELATED APPLICATION

This application is based on and claims the benefit of priority from Japanese Patent Application Serial No. 2020-146279 (filed on Aug. 31, 2020), the contents of which are hereby incorporated by reference in their entirety.

TECHNICAL FIELD

The present disclosure relates to a speed reducer, a drive unit and a steering assisting device.

BACKGROUND

Vehicles include several devices constituting their steering system. A known one of such devices is a steering assisting device using a force produced by hydraulic pressure and electric motors to assist a driver's steering. The steering assisting device includes a steering mechanism for steering wheels in accordance with manipulation of a steering unit (steering wheel) and a drive unit for outputting, to the steering mechanism, an assisting force determined by the steering force applied to the steering unit. (See, for example, Japanese Patent Application Publication No. 2013-35475)

The drive unit used in the above-described steering assisting device included a drive device such as an electric motor and a speed reducer for reducing the speed of the output from the drive device. The speed reducer includes an input rotating body rotatable when acted upon by power from the drive device, a speed reducing mechanism unit for reducing the speed of the rotation of the input rotating body, and an output rotating body rotatable when acted upon by the speed-reduced power from the speed reducing mechanism unit. The speed reducer is configured to transmit the rotation of the output rotating body to the steering mechanism.

The steering assisting device or the like may use a speed reducer including an input rotating body, a base block rotatably supporting the input rotating body, a speed reducing mechanism unit for reducing the speed of the rotation of the input rotating body, and a tubular case externally covering the speed reducing mechanism unit and base block and rotatably assembled onto the base block. In the speed reducer of this type, the tubular case rotates as an output rotating body in a case where the base block is attached to an external stationary member such as a vehicle body attachment portion. In a different case where the tubular case is attached to an external stationary member such as a vehicle body attachment portion, the base block rotates as an output rotating body.

In the speed reducer of this type, a fixture flange member is attached to the axial end surface of the base block in order to attach the base block onto the external stationary member. The flange member is assembled onto the stationary member via, for example, fastening bolts. In other words, the separately formed flange member for fixture is overlaid and attached to the axial end surface of the base block in the speed reducer of this type.

The speed reducer of this type accordingly encounters difficulties in responding to the demand for size reduction of the entire speed reducer since the overall axial length of the speed reducer is extended due to the separately formed flange member, which is overlaid and attached onto the end surface of the base block. In addition, the speed reducer as a whole is constituted by an increased number of parts.

SUMMARY

Aspects of the present disclosure provide a speed reducer, a drive unit and a steering assisting device capable of achieving a reduced number of parts and a shortened axial length.

(1) An aspect of the present disclosure provides a speed reducer including an input rotating body rotatable when acted upon by power from a drive device, a base block supporting the input rotating body rotatably, a speed reducing mechanism unit for reducing a speed of rotation of the input rotating body, and a tubular case externally covering the speed reducing mechanism unit and the base block, the tubular case being assembled onto the base block such that the tubular case and the base block are rotatable relative to each other. The speed-reduced rotation from the speed reducing mechanism unit is output from one of the tubular case and the base block. The base block has a fixture flange integrally formed therewith, and the flange extends from a radially inner region within the tubular case radially outward beyond an outer peripheral surface of the tubular case.

(2) The base block may have an annular groove open axially, and the annular groove may be positioned between a substrate portion arranged radially inside the tubular case and the fixture flange. The annular groove houses one of axial ends of the tubular case therein.

(3) A sealing member may be disposed between an inner peripheral surface of the annular groove and an outer peripheral surface of the tubular case for providing sealing between the base block and the tubular case.

(4) An aspect of the present disclosure provides a drive unit including a drive device for outputting rotational power, and a speed reducer for receiving power from the drive device and reducing a speed of input rotation. The speed reducer includes an input rotating body rotatable when acted upon by the power from the drive device, a base block rotatably supporting the input rotating body, a speed reducing mechanism unit for reducing the speed of the rotation of the input rotating body, and a tubular case externally covering the speed reducing mechanism unit and the base block, where the tubular case being assembled onto the base block such that the base block and the tubular case are rotatable relative to each other. The speed-reduced rotation from the speed reducing mechanism unit is output from one of the tubular case and the base block. The base block has a fixture flange integrally formed therewith, and the flange extends from a radially inner region within the tubular case radially outward beyond an outer peripheral surface of the tubular case.

(5) An aspect of the present disclosure provides a steering assisting device including a drive device for outputting rotational power, a speed reducer for receiving power from the drive device and reducing a speed of input rotation, and a steering mechanism operable when acted upon by speed-reduced power from the speed reducer. The speed reducer includes an input rotating body rotatable when acted upon by power from the drive device, a base block rotatably supporting the input rotating body, a speed reducing mechanism unit for reducing a speed of the rotation of the input rotating body, and a tubular case externally covering the speed reducing mechanism unit and base block, where the tubular case being assembled onto the base block such that the base block and the tubular case are rotatable relative to each other. The speed-reduced rotation from the speed reducing mechanism unit is output from one of the tubular case and the base block. The base block has a fixture flange integrally formed therewith, and the flange extends from a radially inner region within the tubular case radially outward beyond an outer peripheral surface of the tubular case.

In the above-described speed reducer, the base block has the fixture flange integrally formed therewith, and the flange extends from the radially inner region within the tubular case radially outward beyond the outer peripheral surface of the tubular case. With such configurations, when compared with the case where a separately formed fixture flange member is attached onto the end surface of the base block, the aspects of the present disclosure can achieve a reduced number of parts and the fixture flange relating to the aspects of the present disclosure does not occupy an axially large space in the speed reducer. Accordingly, the speed reducer described above can achieve a reduced number of parts and a shortened axial length.

DESCRIPTION OF THE PREFERRED EMBODIMENTS

The following describes embodiments of the present disclosure with reference to the drawings.

<Steering Assisting Device>

Figure 1:
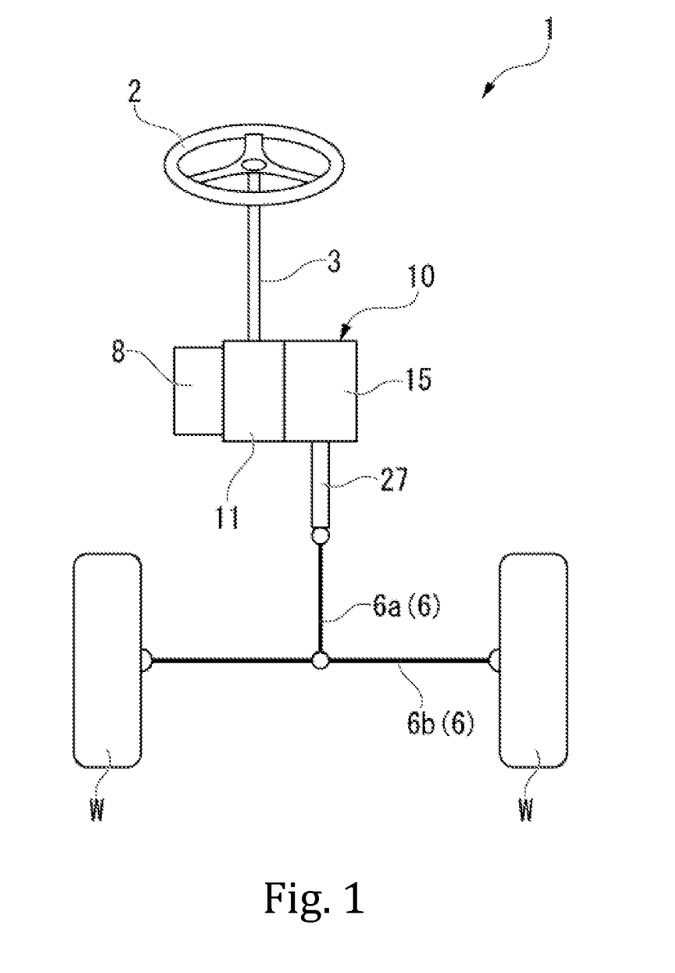
FIG. 1 schematically shows a configuration of a steering assisting device relating an embodiment.

FIG. 1 schematically shows the configuration of a steering assisting device 1 for a vehicle, employing a drive unit 10 relating to an embodiment of the present invention. The steering assisting device 1 includes a steering wheel 2, a steering shaft 3, the drive unit 10 also serving as a steering transmitting unit, and a steering mechanism 6 configured to be steered through the drive unit 10. The steering wheel 2 is provided in the vehicle in front of the driver's seat and manipulated or rotated by the driver. The steering shaft 3 is integrally coupled with the steering wheel 2 and rotatable integrally with the steering wheel 2.

The drive unit 10 includes a motor 8 or a drive device provided for assisting steering and a speed reducer 11 (111, 211, 311, 411) for reducing the speed of the rotation of the motor 8 and transmitting the speed-reduced rotation to the steering mechanism 6. The drive unit 10 is coupled to the lower end of the steering shaft 3. The steering torque transmitted from the steering wheel 2 to the steering shaft 3 is input into the input unit of the speed reducer 11 via a gear mechanism, not shown. In the speed reducer 11, the input unit combines together the input steering torque and the assisting torque from the motor 8 and transmits the combined torque to a speed reducing mechanism unit. Accordingly, the result of combining together the steering torque and assisting torque is reduced in speed with a predetermined reduction ratio and output to the output unit side (the steering mechanism 6 side) in the speed reducer 11.

The steering shaft 3 has a torque sensor (not shown) provided thereon. The torque detected by the torque sensor is input into a controller (not shown) for controlling the motor 8. The controller is configured to control the output from the motor 8 based on a signal input from the torque sensor. The driver steering the steering wheel 2 is assisted by the torque provided by the motor 8, which is controlled by the controller.

The output unit in the speed reducer 11 has an output arm 27 (described below) provided. The tip end of the output arm 27 is coupled with the steering mechanism 6 of the vehicle. The steering mechanism 6 includes an operating arm 6a for receiving an operating force from the output arm 27 and a tie rod 6b for steering the front wheels W of the vehicle in response to the manipulation of the operating arm 6a. The following describes speed reducers 11, 111, 211, 311 and 411 relating to respective embodiments, which can be used in the steering assisting device 1 shown in FIG. 1.

First Embodiment

Figure 2:
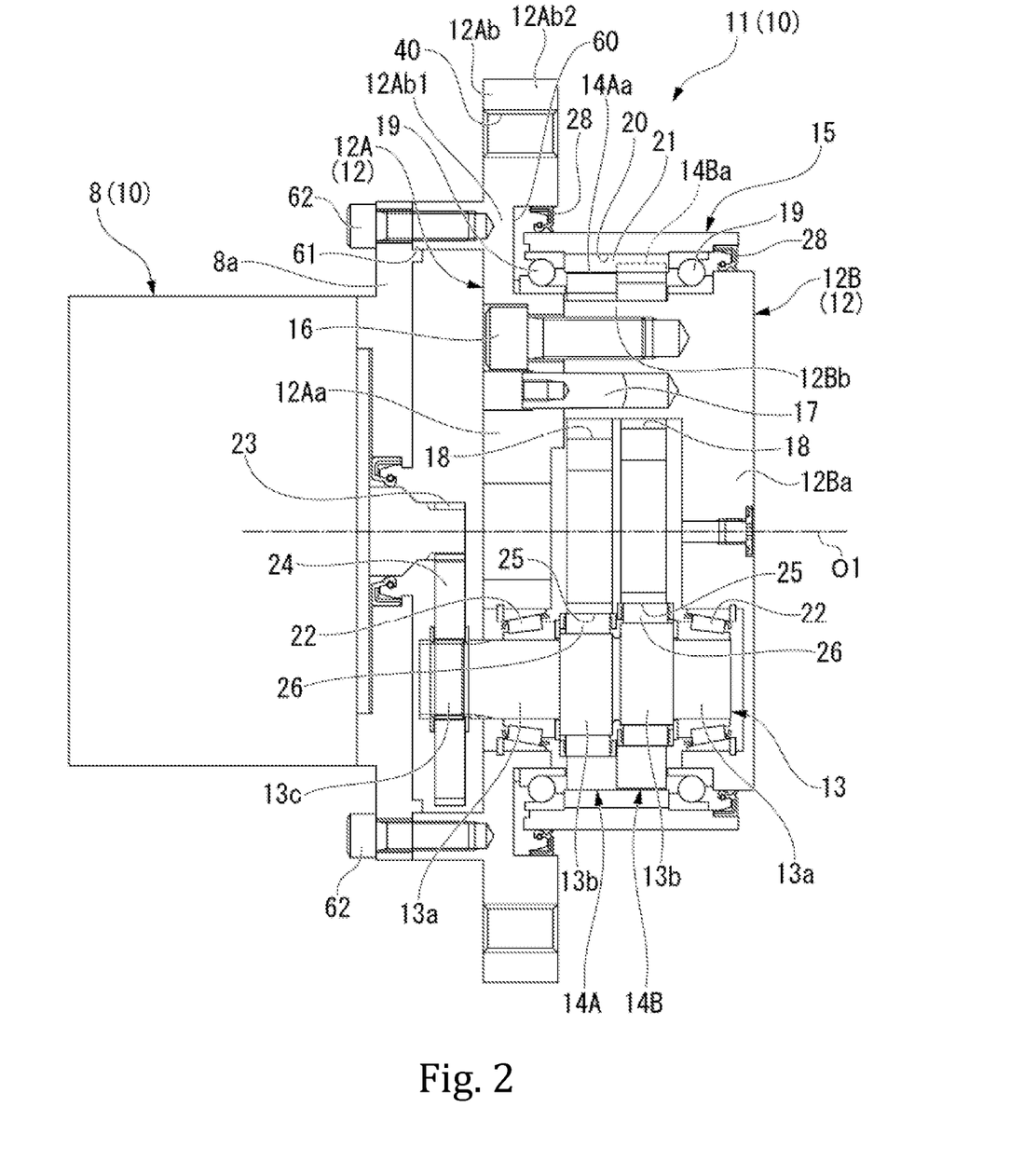
FIG. 2 is a longitudinal sectional view of a speed reducer according to a first embodiment.

FIG. 2 is a longitudinal sectional view of the speed reducer 11 according to a first embodiment. The speed reducer 11 includes a base block 12 fixedly provided in a vehicle, a plurality of (for example, three) crankshafts 13 (input rotating body) rotatably supported on the base block 12, a first oscillating gear 14A and a second oscillating gear 14B oscillatorily rotatable together with two eccentric rotating portions 13b of each crankshaft 13, and a tubular case 15 rotatably supported on the outer peripheral surface of the base block 12 such that the tubular case 15 covers the radially outer surface of the first and second oscillating gears 14A and 14B.

The base block 12 is, as a whole, shaped like a circular cylinder having a small axial length. In the following description, for the sake of convenience, the terms "axially" and "axial" refer to the direction extending along a central axis O1 of the base block 12, and the terms "radially" and "radial" refer to a radiating direction centered on the central axis O1. Furthermore, the term "axially inside" may refer to the inwardly facing side of an object, and the term "axially outside" may refer to the opposite side of the object. These terms are similarly used in the description of the other embodiments.

The base block 12 includes a first base block 12A positioned on one side axially and a second base block 12B positioned on the other side axially. The first base block 12A includes a substrate portion 12Aa shaped like a disc and a fixture flange 12Ab extending radially outward from the outer peripheral portion of the substrate portion 12Aa. The fixture flange 12Ab is, for example, cast integrally with the substrate portion 12Aa of the first base block 12A. The fixture flange 12Ab extends radially outward beyond the outer peripheral surface of the tubular case 15.

The first base block 12A has a ring-shaped annular groove 60 formed therein and positioned between the substrate portion 12Aa and the fixture flange 12Ab. The annular groove 60 is open axially toward the other side (toward the second base block 12B side). The fixture flange 12Ab includes a thin intermediate portion 12Ab1 constituting the bottom wall of the annular groove 60 and a flange body portion 12Ab2 positioned on the radially outer side of the intermediate portion 12Ab1. The flange body portion 12Ab2 has substantially the same thickness as the substrate portion 12Aa. The annular groove 60 is defined by the outer peripheral surface of the substrate portion 12Aa and the intermediate portion 12Ab1 and the flange body portion 12Ab2 of the fixture flange 12Ab.

The flange body portion 12Ab2 has a bolt insertion hole 40 formed therein and axially extending through the flange body portion 12Ab2. The bolt insertion hole receives therein a bolt (not shown) for fixedly attaching the speed reducer 11 onto a vehicle body. The intermediate portion 12Ab1 has a tubular wall 61 formed thereon. The tubular wall 61 is shaped like a circular cylinder and axially protrudes toward the one side (toward the motor 8). On the end of the tubular wall 61, a case 8a of the motor 8 is fixedly attached via a bolt 62.

The second base block 12B includes a substrate portion 12Ba and a plurality of coupling columns 12Bb. The substrate portion 12Ba is shaped like a disc and has substantially the same outer diameter as the substrate portion 12Aa of the first base block 12A. The coupling columns 12Bb extend from the end surface of the substrate portion 12Ba toward the first base block 12A. On the end surface of the substrate portion 12Ba, the plurality of (for example, three) coupling columns 12Bb are arranged on concentric circles centered on the central axis O1.

The second base block 12B is assembled with the first base block 12A by fixedly fastening the coupling columns 12Bb to the first base block 12A via bolts 16, with the end surface of the coupling columns 12Bb abutting the end surface of the substrate portion 12Aa of the first base block 12A. The reference number 17 in FIG. 2 indicates an alignment pin for aligning the first base block 12A with the coupling columns 12Bb before the coupling columns 12Bb are fastened to the first base block 12A via the bolts 16.

An axial gap is left between the substrate portion 12Aa of the first base block 12A and the substrate portion 12Ba of the second base block 12B. In this gap, a first oscillating gear 14A and a second oscillating gear 14B are arranged. The first and second oscillating gears 14A and 14B each have a plurality of relief holes 18 formed therein, which are penetrated by the support columns 12Bb of the second base block 12B. The relief holes 18 are sufficiently larger than the outer diameter of the coupling columns 12Bb, so that the coupling columns 12Bb do not hinder the oscillatory rotation of the first and second oscillating gears 14A and 14B.

The tubular case 15 extends over the outer peripheral surface of the substrate portion 12Aa of the first base block 12A and the outer peripheral surface of the substrate portion 12Ba of the second base block 12B. The edges of the tubular case 15 on axially both sides are rotatably supported, via bearings 19, on the outer peripheral surface of the substrate portion 12Aa of the first base block 12A and the substrate portion 12Ba of the second base block 12B, respectively. The edge of the tubular case 15 on the axially one side is supported on the outer peripheral surface of the substrate portion 12Aa, via a corresponding one of the bearings 19, in the annular groove 60 in the first base block 12A. On the outer peripheral surface of the tubular case 15, an output arm 27 is integrally formed and extends radially outward, as shown in FIG. 1.

In the inner peripheral surface of the axially middle region of the tubular case 15 (the region facing the outer peripheral surface of the first and second oscillating gears 14A and 14B), a plurality of pin grooves 20 are formed and extend in a direction parallel to the central axis O1 of the first and second base blocks 12A and 12B. Each of the pin grooves 20 receives an inner tooth pin 21 therein. The inner tooth pins 21 have a substantially cylindrical shape and are received in a rotatable manner. The plurality of inner tooth pins 21 attached to the inner peripheral surface of the tubular case 15 face the outer peripheral surface of the first and second oscillating gears 14A and 14B.

The first and second oscillating gears 14A and 14B have an outer diameter slightly smaller than the inner diameter of the tubular case 15. On the outer peripheral surface of the first oscillating gear 14A, outer teeth 14Aa are formed such that the outer teeth 14Aa touch in a meshing manner the inner tooth pins 21 disposed on the inner peripheral surface of the tubular case 15. On the outer peripheral surface of the second oscillating gear 14B, outer teeth 14Ba are formed such that the outer teeth 14Ba touch in a meshing manner the inner tooth pins 21 disposed on the inner peripheral surface of the tubular case 15. The respective numbers of the outer teeth 14Aa and 14Ba are slightly smaller than the number of the inner tooth pins 21 (the pin grooves 20) (by one, for example).

The crankshafts 13 are arranged on the same circumference centered at the central axis O1 of the first and second base blocks 12A and 12B. Each of the crankshafts 13 is rotatably supported by the first and second base blocks 12A and 12B via the bearings 22. Each crankshaft 13 includes a pair of journals 13a separated from each other axially. The journals 13a are supported on the bearings 22. Each crankshaft 13 has the above-mentioned two eccentric rotating portions 13b provided between the journals 13a.

On the end of the crankshaft 13 on the axially one side (the side where the motor 8 is positioned), a gear attachment portion 13c is formed adjacently to the journal 13a. The gear attachment portion 13c axially protrudes outward beyond the substrate portion 12Aa of the first base block 12A. The gear attachment portion 13c has a crank gear 24 attached thereto, meshing with an output gear 23 of the motor 8.

The crank gear 24 meshes with the gear of the gear mechanism (not shown) formed on the steering shaft 3 (see FIG. 1). This allows the manipulating force applied by the driver to manipulate the steering wheel 2 to be input into the crankshafts 13 via the crank gear 24 and, at the same time, the assisting force produced by the motor 8 to be input into the crankshafts 13 via the crank gear 24.

The first and second oscillating gears 14A and 14B have a supporting hole 25 formed therein, which is penetrated by the eccentric rotating portions 13b of the crankshafts 13. An eccentric portion bearing 26 (cylindrical rolling bearing) is provided in the supporting hole 25 formed in the first and second oscillating gears 14A and 14B. In this manner, the first and second oscillating gears 14A and 14B are supported on the corresponding eccentric rotating portions 13b of the crankshafts 13 via the eccentric portion bearings 26.

In the speed reducer 11, as the crankshafts 13 rotate in one direction when acted upon by torque from the steering shaft 3 and motor 8, the eccentric rotating portions 13b of the crankshafts 13 revolve in the same direction with a predetermined radius. As the eccentric rotating portions 13b revolve, the first and second oscillating gears 14A and 14B oscillatorily rotate in the same direction with the same radius. During the oscillatory rotation, the outer teeth 14Aa, 14Ba of the first and second oscillating gears 14A and 14B touch in a meshing manner the inner tooth pins 21 retained on the inner peripheral surface of the tubular case 15.

In the speed reducer 11, the respective numbers of the outer teeth 14Aa and 14Ba of the first and second oscillating gears 14A and 14B are slightly smaller than the number of the inner tooth pins 21 on the tubular case 15. Accordingly, while the first and second oscillating gears 14A and 14B oscillatorily rotate once, the outer teeth 14Aa and 14Ba of the first and second oscillating gears 14A and 14B move the tubular case 15 at a predetermined pitch in the same direction. As a result, the rotation of the crankshafts 13 is reduced in speed at a predetermined reduction ratio and then output in the form of the rotation of the tubular case 15. In the present embodiment, the crankshafts 13 constitute an input rotating body of the speed reducer 11. The first and second oscillating gears 14A and 14B constitute a speed reducing mechanism unit of the speed reducer 11, when combined with the inner tooth pins 21 and the like.

On the end of the tubular case 15 on the axially one side, a seal member 28 provides sealing between the outer peripheral surface of the tubular case 15 and the inner peripheral surface of the annular groove 60. The seal member 28 is provided in the annular groove 60 such that the seal member 28 is positioned on the radially outer side of the bearing 19 with the circumferential wall of the tubular case 15 being sandwiched therebetween. In other words, the seal member 28 and bearing 19 are positioned in the annular groove 60 such that they axially lap each other. On the other end of the tubular case 15 on the axially other side, another seal member 28 similarly provides sealing between the inner peripheral surface of the tubular case 15 and the outer peripheral surface of the substrate portion 12Ba of the second base block 12B. The space delineated by the tubular case 15 and base block 12, where the speed reducing mechanism unit is placed, is filled with a lubricant liquid for lubricating mechanical parts such as the speed reducing mechanism unit.

In the above-described speed reducer 11 relating to the present embodiment, the fixture flange 12Ab extending from the radially inner region within the tubular case 15 radially outward beyond the outer peripheral surface of the tubular case 15 is integrally formed with the first base block 12A (base block 12). With such configurations, when compared with the case where a separately formed fixture flange member is attached onto the end surface of the base block, the present embodiment can achieve a reduced number of parts and the fixture flange relating to the present embodiment does not occupy an axially large space in the speed reducer 11. Accordingly, the speed reducer 11 relating to the present embodiment can achieve a reduced number of parts and a shortened axial length.

In the speed reducer 11 relating to the present embodiment, the annular groove 60 open axially is formed between the substrate portion 12Aa of the first base block 12A, which is radially inside the tubular case 15, and the fixture flange 12Ab. The annular groove 60 houses one of the axial ends of the tubular case 15 therein. With such configurations, the tubular case 15 and the fixture flange 12Ab can be arranged such that they partly lap each other axially in the speed reducer 11 relating to the present embodiment. The speed reducer 11 can thus achieve a further shortened axial length. In addition, the flange body portion 12Ab2, which is fixedly fastened onto the vehicle body, can have a sufficiently large thickness in the speed reducer 11 relating to the present embodiment.

In the speed reducer 11 relating to the present embodiment, the sealing member 28 is disposed between the inner peripheral surface of the annular groove 60 and the outer peripheral surface of the tubular case 15 to provide sealing between the first base block 12A (base block 12) and the tubular case 15. Stated differently, the sealing between the first base block 12A and the tubular case 15 can be provided at the position where they axially lap the bearing 19. This means that, having the configuration described above, the speed reducer 11 can achieve a further shortened axial length.

According to the above-described embodiment, the base block 12 is fixedly attached to the vehicle body and the tubular case 15 constitutes the output rotating body. The present invention is, however, not limited to such. For example, contrary to the above-described embodiment, the tubular case 15 can be fixedly attached to the vehicle body and the base block 12 can constitute the output rotating body.

In the following description of other embodiments, the same elements as those in the first embodiment are denoted by the same reference numerals.

Second Embodiment

Figure 3:
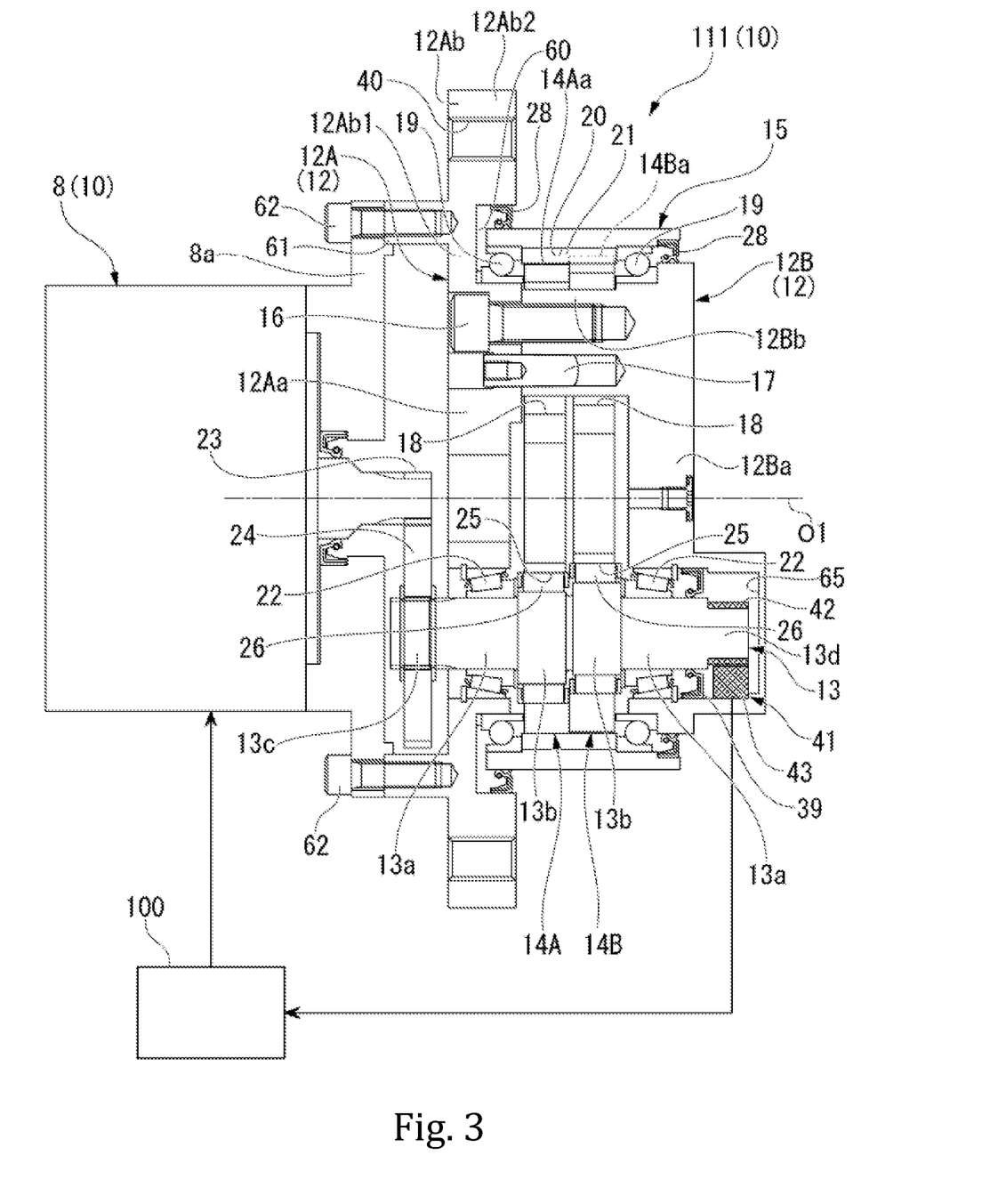
FIG. 3 is a longitudinal sectional view of a speed reducer according to a second embodiment.

FIG. 3 is a longitudinal sectional view of a speed reducer 111 according to a second embodiment. The speed reducer 111 relating to the second embodiment includes a base block 12 fixedly provided in a vehicle, a plurality of crankshafts 13 (input rotating body) rotatably supported on the base block 12, a first oscillating gear 14A and a second oscillating gear 14B oscillatorily rotatable when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain inner tooth pins 21 therein. The inner tooth pins 21 constitute the speed reducing mechanism unit when combined with the first and second oscillating gears 14A and 14B. The foregoing basic configuration of the second embodiment is the same as that of the first embodiment.

The base block 12 includes a first base block 12A positioned on one side axially and a second base block 12B positioned on the other side axially. The second base block 12B is assembled with the first base block 12A by fixedly fastening coupling columns 12Bb to a substrate portion 12Aa of the first base block 12A via bolts 16, with the coupling columns 12Bb abutting the substrate portion 12Aa.

A fixture flange 12Ab, which extends radially outward from the substrate portion 12Aa of the first base block 12A, extends radially outward beyond the outer peripheral surface of the tubular case 15. The fixture flange 12Ab has an annular groove 60 formed therein. The annular groove 60 houses one of the axial ends of the tubular case 15 therein. The structure constituted by the fixture flange 12Ab and one end of the tubular case 15 is the same as described in the first embodiment. The inner space within the speed reducer 111 is filled with a lubricant liquid for lubricating mechanical parts such as the speed reducing mechanism unit.

One of the crankshafts 13 axially protrudes outward beyond a bearing 22 supporting a journal 13a positioned on the axially other side. This portion of the crankshaft 13 that protrudes beyond the bearing 22A is referred to as a protruding portion 13d. A substrate portion 12Ba of the second base block 12B has a depression 65 formed therein, housing the protruding portion 13d of the crankshaft 13 therein. Between the inner wall of the depression 65 and the protruding portion 13d of the crankshaft 13, a rotation detector device 41 is provided for detecting the rotational state of the crankshaft 13 (the rotational position and rotational speed).

The rotation detector device 41 includes a detection target 42 attached to the outer peripheral surface of the protruding portion 13d of the crankshaft 13 and a target detecting unit 43 attached to the inner wall of the depression 65 in the second base block 12B. The target detecting unit 43 is configured to output a signal determined by the rotation of the crankshaft 13 to a controller 100. The rotation detector device 41 can be constituted using, for example, a magnetic or optical detector device. The target detecting unit 43 of the rotation detector device 41 is attached to the inner wall of the depression 65 such that the detecting surface of the target detecting unit 43 faces the detection target 42 with a micro gap being provided therebetween.

The signal input from the rotation detector device 41 to the controller 100 can be used, for example, when the controller 100 acknowledges that an assisting signal (drive signal) is suspended from being output to the motor 8 for some reason and takes care of the situation, or when the deviation of the actual rotation of the motor 8 from the target output is corrected. If the controller 100 acknowledges that the assisting signal (drive signal) is suspended from being output to the motor 8, the controller 100 removes the reaction force of the motor 8 acting on the speed reducer 111, for example. This control can prevent the reaction force of the motor 8 from interrupting the driver's manual manipulation of the steering wheel.

Between the outer peripheral surface of the base-side region of the protruding portion 13d of the crankshaft 13 and the inner peripheral surface of the depression 65 in the second base block 12B, a seal member 39 is disposed to provide sealing between the crankshaft 13 and the second base block 12B. The internal space defined within the depression 65 in the second base block 12B is divided by the seal member 39 into a bottom region where the rotation detector device 41 and a lubricating region where the bearing 22 is provided. The lubricant liquid in the speed reducer 111 flows into the lubricating region. Here, the seal member 39 blocks the lubricant liquid from flowing from the lubricating region to the bottom region.

In the above-described speed reducer 111 relating to the present embodiment, the fixture flange 12Ab extending from the radially inner region within the tubular case 15 radially outward beyond the outer peripheral surface of the tubular case 15 is integrally formed with the first base block 12A (base block 12). With such configurations, when compared with the case where a separately formed fixture flange member is attached onto the end surface of the base block, the present embodiment can achieve a reduced number of parts and the fixture flange relating to the present embodiment does not occupy an axially large space in the speed reducer 111. Accordingly, the speed reducer 111 relating to the present embodiment can achieve a reduced number of parts and a shortened axial length.

In the speed reducer 111 of the present embodiment, the rotation detector device 41 is provided on the base block 12 for detecting the rotation of the crankshaft 13, which constitutes the input rotating body. This allows the information relating to the rotation caused by the output from the motor 8 to be obtained near the end of the speed reducer 111 where there is a large space. Accordingly, the information relating to the rotation caused by the output from the motor 8 can be effectively used by the controller 100 without increasing the size of the motor 8.

In the speed reducer 111 relating to the present embodiment, the depression 65 is provided in the second base block 12B (base block 12). In the depression 65, the seal member 39 is disposed to provide sealing between the outer peripheral surface of the protruding portion 13d of the crankshaft 13 and the inner peripheral surface of the depression 65. The rotation detector device 41 is provided in the depression 65 in the space partitioned by the seal member 39 away from the space where the lubricant liquid is poured. In this manner, the lubricant liquid can be blocked from flowing into the region surrounding the rotational detector device 41. Accordingly, the use of the speed reducer 111 relating to the present embodiment can achieve improved durability for the rotation detector device 41.

The following lists other inventions that can be derived from the above-described second embodiment. Stated differently, the second embodiment includes the following inventions.

(2-1) A speed reducer including:
a base block (for example, the base block 12);
an input rotating body (for example, the crankshaft 13) rotatable when acted upon by power from a drive device (for example, the motor 8) while being rotatably supported on the base block;
a speed reducing mechanism unit (for example, the first and second oscillating gears 14A and 14B and the inner tooth pins 21) for reducing a speed of rotation of the input rotating body;
an output rotating body (for example, the tubular case 15) rotatable when acted upon by speed-reduced power from the speed reducing mechanism unit; and
a rotation detector device (for example, the rotation detector device 41) provided on the base block, the rotation detector device being configured to detect a rotational state of a shaft of the input rotating body.

(2-2) The speed reducer as set forth in (2-1),
wherein the base block has a depression (for example, the depression 65) formed therein, the depression housing therein an end of the output rotating body,
wherein, in the depression, a seal member (for example, the seal member 39) is disposed to provide sealing between an outer peripheral surface of an end of the output rotating body and a circumferential wall of the depression, and
wherein the rotation detector device is provided in the depression in a space near a bottom of the depression partitioned by the seal member.

(2-3) A speed reducer unit including:
a drive device for outputting rotational power; and
a speed reducer for receiving power from the drive device and reducing a speed of input rotation,
wherein the speed reducer includes:
a base block;
an input rotating body rotatable when acted upon by the power from the drive device while being rotatably supported on the base block;
a speed reducing mechanism unit for reducing a speed of the rotation of the input rotating body; and
an output rotating body rotatable when acted upon by speed-reduced power from the speed reducing mechanism unit; and
a rotation detector device provided on the base block, the rotation detector device being configured to detect a rotational state of a shaft of the input rotating body.

(2-4) A steering assisting device including:
a drive device for outputting rotational power;
a speed reducer for receiving power from the drive device and reducing a speed of input rotation; and
a steering mechanism operable when acted upon by speed-reduced power from the speed reducer,
wherein the speed reducer includes:
a base block;
an input rotating body rotatable when acted upon by the power from the drive device while being rotatably supported on the base block;

a speed reducing mechanism unit for reducing a speed of the rotation of the input rotating body; and an output rotating body rotatable when acted upon by speed-reduced power from the speed reducing mechanism unit; and a rotation detector device provided on the base block, the rotation detector device being configured to detect a rotational state of a shaft of the input rotating body.

Third Embodiment

Figure 4:
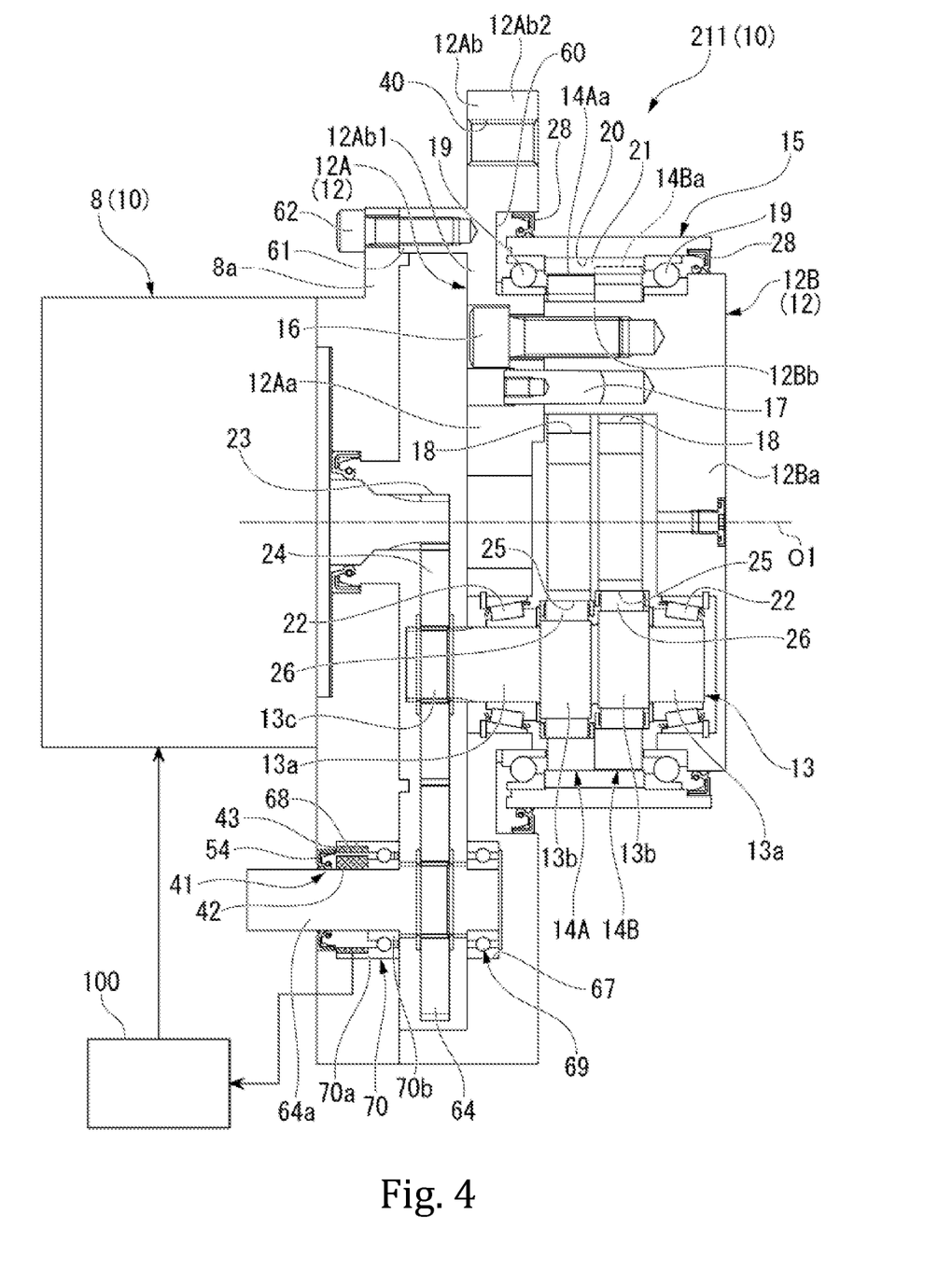
FIG. 4 is a longitudinal sectional view of a speed reducer according to a third embodiment.

FIG. 4 is a longitudinal sectional view of a speed reducer 211 according to a third embodiment. The speed reducer 211 relating to the third embodiment includes a base block 12 fixedly provided in a vehicle, a plurality of crankshafts 13 (input rotating body) rotatably supported on the base block 12, a first oscillating gear 14A and a second oscillating gear 14B oscillatorily rotatable when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain inner tooth pins 21 therein. The inner tooth pins 21 constitute the speed reducing mechanism unit when combined with the first and second oscillating gears 14A and 14B. The foregoing basic configuration of the third embodiment is the same as that of the first embodiment.

The base block 12 includes a first base block 12A positioned on one side axially and a second base block 12B positioned on the other side axially. A fixture flange 12Ab, which extends radially outward from a substrate portion 12Aa of the first base block 12A, extends radially outward beyond the outer peripheral surface of the tubular case 15. The fixture flange 12Ab has an annular groove 60 formed therein. The annular groove 60 houses one of the axial ends of the tubular case 15 therein. The structure constituted by the fixture flange 12Ab and one end of the tubular case 15 is the same as described in the first embodiment. The inner space within the speed reducer 211 is filled with a lubricant liquid for lubricating mechanical parts such as the speed reducing mechanism unit.

An idler gear 64 is disposed at one axial end of the first base block 12A and meshes with a crank gear 24. The idler gear 64 has a gear shaft 64a, and the gear shaft 64a is rotatably supported in a supporting hole 67 in the first base block 12A and in a supporting hole 68 in a case 8a of a motor 8 respectively via bearings 69 and 70 (deep groove ball bearings). Between the supporting hole 68 in the case 8a and the gear shaft 64a of the idler gear 64, sealing is provided by a seal member 54. The seal member 54 is provided on the axially outer side relative to the bearing 70.

The bearing 70 supported in the supporting hole 68 in the motor 8 includes an outer ring 70a and an inner ring 70b, and the outer ring 70a axially extends longer toward the one side than the inner ring 70b. Between a portion of the outer ring 70a that axially extends toward the one side and a corresponding portion of the outer peripheral surface of the gear shaft 64a, a rotation detector device 41 is provided for detecting the rotational state of the gear shaft 64a (the rotational position and rotational speed).

The rotation detector device 41 includes a detection target 42 attached to the outer peripheral surface of the gear shaft 64a of the idler gear 64 and a target detecting unit 43 attached to the inner peripheral surface of the outer ring 70a of the bearing 70. The target detecting unit 43 is configured to output a signal determined by the rotation of the gear shaft 64a of the idler gear 64 to a controller 100. The rotation detector device 41 can be constituted using, for example, a magnetic or optical detector device. The target detecting unit 43 of the rotation detector device 41 is attached to the outer ring 70a of the bearing 70 such that the detecting surface of the target detecting unit 43 faces the detection target 42 with a micro gap being provided therebetween.

The signal input from the rotation detector device 41 to the controller 100 can be used, for example, when the controller 100 acknowledges that an assisting signal (drive signal) is suspended from being output to the motor 8 for some reason and takes care of the situation, or when the deviation of the actual rotation of the motor 8 from the target output is corrected. If the controller 100 acknowledges that the assisting signal (drive signal) is suspended from being output to the motor 8, the controller 100 removes the reaction force of the motor 8 acting on the speed reducer 211, for example. This control can prevent the reaction force of the motor 8 from interrupting the driver's manual manipulation of the steering wheel.

In the above-described speed reducer 211 relating to the present embodiment, the fixture flange 12Ab, which extends from the radially inner region within the tubular case 15 radially outward beyond the outer peripheral surface of the tubular case 15, is integrally formed with the first base block 12A (base block 12). With such configurations, when compared with the case where a separately formed fixture flange member is attached onto the end surface of the base block, the present embodiment can achieve a reduced number of parts and the fixture flange relating to the present embodiment does not occupy an axially large space in the speed reducer 211. Accordingly, the speed reducer 211 relating to the present embodiment can achieve a reduced number of parts and a shortened axial length.

In the speed reducer 211 of the present embodiment, the rotation detector device 41 for detecting the rotational state of the shaft of the gear is provided on the bearing 70 supporting the shaft (the gear shaft 64) of the gear (the idler gear 64) rotatable in accordance with the motor 8. This allows the bearing 70 to produce the information relating to the rotation at the destination side of the output from the motor 8. In the speed reducer 211 relating to the present embodiment, the target detecting unit 43 of the rotation detector device 41 is attached to the outer ring 70a of the bearing 70, and the detection target 42 is attached to the outer peripheral surface of the shaft of the gear. Accordingly, the use of the speed reducer 211 relating to the present embodiment allows the rotation detector device 41 to be easily attached without requiring a large area.

The following lists other inventions that can be derived from the above-described third embodiment. Stated differently, the third embodiment includes the following inventions.

(3-1) A speed reducer including:

a base block (for example, the base block 12);

an input rotating body (for example, the crankshaft 13) rotatable when acted upon by power from a drive device (for example, the motor 8) while being rotatably supported on the base block;

a speed reducing mechanism unit (for example, the first and second oscillating gears 14A and 14B and the inner tooth pins 21) for reducing a speed of the rotation of the input rotating body;

an output rotating body (for example, the tubular case 15) rotatable when acted upon by speed-reduced power from the speed reducing mechanism unit; and a rotation detector device (for example, the rotation detector device 41) provided on a bearing (for example, the bearing 70) of a gear shaft (for example, the gear shaft 64a) rotatable when acted upon by power from the drive device, the rotation detector device being configured to detect a rotational state of the gear shaft.

(3-2) A drive unit including:

a drive device for outputting rotational power; and a speed reducer for receiving power from the drive device and reducing a speed of input rotation, wherein the speed reducer includes:

a base block;

an input rotating body rotatable when acted upon by the power from the drive device while being rotatably supported on the base block;

a speed reducing mechanism unit for reducing a speed of the rotation of the input rotating body; and an output rotating body rotatable when acted upon by speed-reduced power from the speed reducing mechanism unit; and a rotation detector device provided on a bearing of a gear shaft rotatable when acted upon by power from the drive device, the rotation detector device being configured to detect a rotational state of the gear shaft.

(3-3) A steering assisting device including:

a drive device for outputting rotational power;

a speed reducer for receiving power from the drive device and reducing a speed of input rotation; and a steering mechanism operable when acted upon by speed-reduced power from the speed reducer, wherein the speed reducer includes:

a base block;

an input rotating body rotatable when acted upon by the power from the drive device while being rotatably supported on the base block;

a speed reducing mechanism unit for reducing a speed of the rotation of the input rotating body; and an output rotating body rotatable when acted upon by speed-reduced power from the speed reducing mechanism unit; and a rotation detector device provided on a bearing of a gear shaft rotatable when acted upon by power from the drive device, the rotation detector device being configured to detect a rotational state of the gear shaft.

Fourth Embodiment

Figure 5:
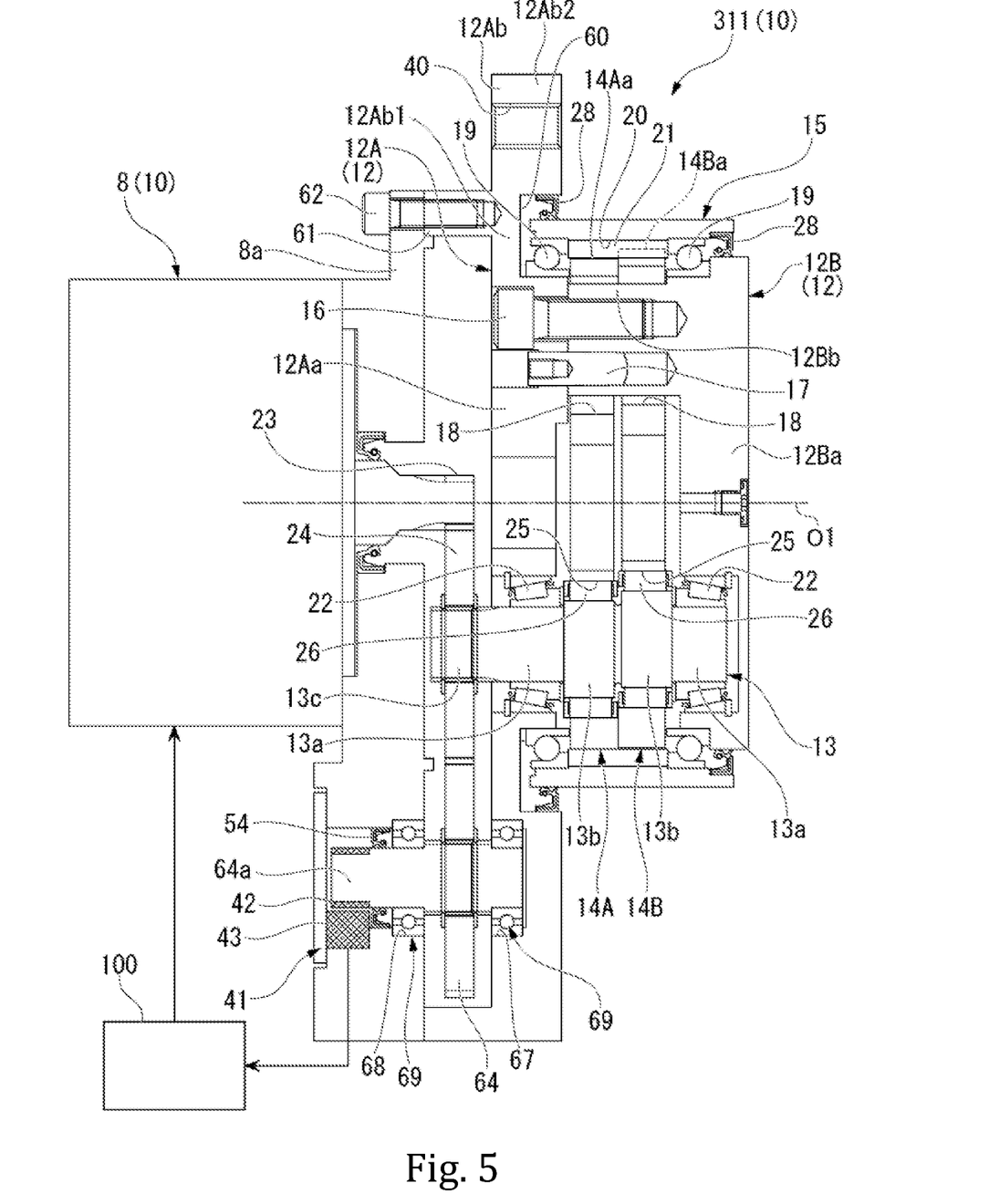
FIG. 5 is a longitudinal sectional view of a speed reducer according to a fourth embodiment.

FIG. 5 is a longitudinal sectional view of a speed reducer 311 according to a fourth embodiment. The speed reducer 311 relating to the fourth embodiment includes a base block 12 fixedly provided in a vehicle, a plurality of crankshafts 13 (input rotating body) rotatably supported on the base block 12, a first oscillating gear 14A and a second oscillating gear 14B oscillatorily rotatable when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain inner tooth pins 21 therein. The inner tooth pins 21 constitute the speed reducing mechanism unit when combined with the first and second oscillating gears 14A and 14B. The foregoing basic configuration of the fourth embodiment is the same as that of the first embodiment.

The base block 12 includes a first base block 12A positioned on one side axially and a second base block 12B positioned on the other side axially. A fixture flange 12Ab, which extends radially outward from a substrate portion 12Aa of the first base block 12A, extends radially outward beyond the outer peripheral surface of the tubular case 15. The fixture flange 12Ab has an annular groove 60 formed therein. The annular groove 60 houses one of the axial ends of the tubular case 15 therein. The structure constituted by the fixture flange 12Ab and one end of the tubular case 15 is the same as described in the first embodiment. The inner space within the speed reducer 311 is filled with a lubricant liquid for lubricating mechanical parts such as the speed reducing mechanism unit.

An idler gear 64 is disposed at one axial end of the first base block 12A and meshes with a crank gear 24. The idler gear 64 has a gear shaft 64a, and the gear shaft 64a is rotatably supported in a supporting hole 67 in the first base block 12A and in a supporting hole 68 in a case 8a of a motor 8 respectively via bearings 69. Between the supporting hole 68 in the case 8a and the gear shaft 64a of the idler gear 64, sealing is provided by a seal member 54. The seal member 54 is provided on the axially outer side relative to the bearing 69.

A detection target 42 of a rotation detector device 41 is attached to the outer peripheral surface of a portion of the gear shaft 64a of the idler gear 64 that axially protrudes outward beyond the seal member 54. A target detecting unit 43 of the rotation detector device 41 is attached to the case 8a of the motor 8 at a position facing the supporting hole 68. The rotation detector device 41 can be configured in the same manner as in the third embodiment.

A signal input from the rotation detector device 41 to a controller 100 can be used, for example, when the controller 100 acknowledges that an assisting signal (drive signal) is suspended from being output to the motor 8 for some reason and takes care of the situation, or when the deviation of the actual rotation of the motor 8 from the target output is corrected. If the controller 100 acknowledges that the assisting signal (drive signal) is suspended from being output to the motor 8, the controller 100 removes the reaction force of the motor 8 acting on the speed reducer 311, for example. This control can prevent the reaction force of the motor 8 from interrupting the driver's manual manipulation of the steering wheel.

In the above-described speed reducer 311 relating to the present embodiment, the fixture flange 12Ab extending from the radially inner region within the tubular case 15 radially outward beyond the outer peripheral surface of the tubular case 15 is integrally formed with the first base block 12A (base block 12). With such configurations, when compared with the case where a separately formed fixture flange member is attached onto the end surface of the base block, the present embodiment can achieve a reduced number of parts and the fixture flange relating to the present embodiment does not occupy an axially large space in the speed reducer 311. Accordingly, the speed reducer 311 relating to the present embodiment can achieve a reduced number of parts and a shortened axial length.

The speed reducer 311 of the present embodiment includes the rotation detector device 41 for detecting the rotation of the gear shaft 64a of the idler gear 64. This allows the portion supporting the gear shaft 64a of the idler gear 64 to produce the information relating to the rotation caused by the output from the motor 8. Accordingly, the use of the speed reducer 311 relating to the present embodiment allows the rotation detector device 41 configured to detect the rotational state of the idler gear 64 to be easily attached without requiring a large area.

Fifth Embodiment

Figure 6:
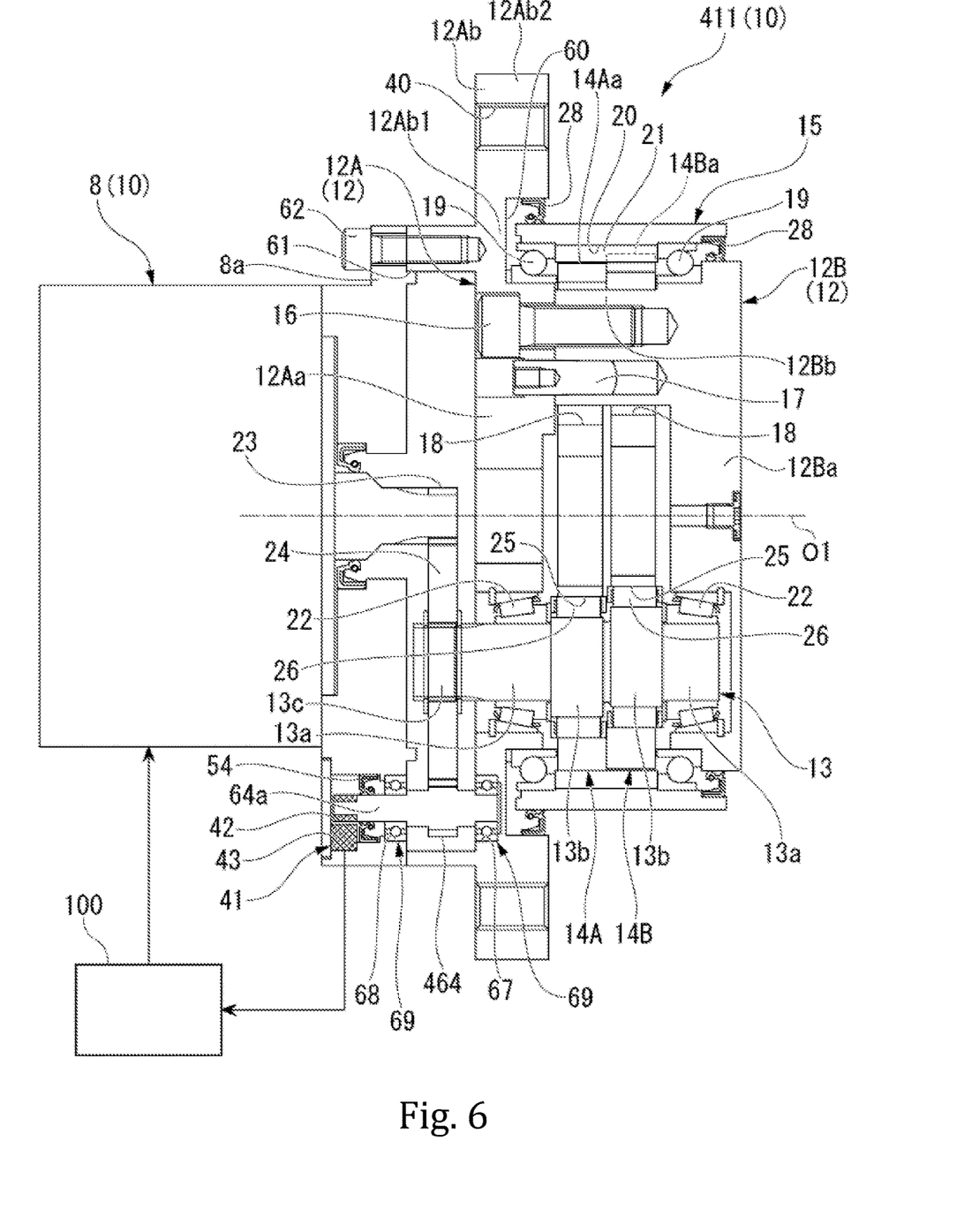
FIG. 6 is a longitudinal sectional view of a speed reducer according to a fifth embodiment.

FIG. 6 is a longitudinal sectional view of a speed reducer 411 according to a fifth embodiment. The speed reducer 411 of the present embodiment is configured in substantially the same manner as the speed reducer 311 of the fourth embodiment. The speed reducer 411 of the present embodiment is different from the speed reducer 311 of the fourth embodiment in that the outer diameter and the number of teeth of an idler gear 464 are equal to those of an output gear 23 of a motor 8. In the present embodiment, a rotation detector device 41 can also detect the rotational state of a gear shaft 64a of the idler gear 464.

Since the speed reducer 411 of the fifth embodiment is basically configured in the same manner as the speed reducer 211 of the third embodiment, the fifth embodiment can basically produce the same effects as the third embodiment.

Note that, however, the outer diameter and the number of teeth of the idler gear 464 are equal to those of the output gear 23 of the motor 8 in the speed reducer 411 of the present embodiment. Accordingly, the rotation detector device 41 detects the rotational state of the gear shaft 64a of the idler gear 464, so that the controller 100 can directly know the rotational state of the motor 8. Therefore, if the foregoing configurations are employed, the signal indicative of the rotational speed detected by the rotation detector device 41 can be directly fed back and used to control the motor 8. This means that the foregoing configurations of the present embodiment can facilitate the control of aligning the rotational speed of the motor 8 to the target speed.

The following lists other inventions that can be derived from the above-described fourth and fifth embodiments. Stated differently, the fourth and fifth embodiments include the following inventions.

(4-1) A speed reducer including:
a base block (for example, the base block 12);
an input rotating body (for example, the crankshaft 13) rotatable when acted upon by power from a drive device (for example, the motor 8) while being rotatably supported on the base block;
a speed reducing mechanism unit (for example, the first and second oscillating gears 14A and 14B and the inner tooth pins 21) for reducing a speed of the rotation of the input rotating body;
an output rotating body (for example, the tubular case 15) rotatable when acted upon by speed-reduced power from the speed reducing mechanism unit;
an idler gear (for example, the idler gear 64) rotatable in a meshing manner with a gear provided on the input rotating body; and
a rotation detector device (for example, the rotation detector device 41) for detecting a rotational state of a gear shaft (for example, the gear shaft 64a) of the idler gear.

(4-2) The speed reducer as set forth in (4-1), wherein an outer diameter and the number of teeth of the idler gear are equal to an outer diameter and the number of teeth of an output gear (for example, the gear shaft 64a) of the motor.

(4-3) A drive unit including:
a drive device for outputting rotational power; and
a speed reducer for receiving power from the drive device and reducing a speed of input rotation,
wherein the speed reducer includes:
a base block;
an input rotating body rotatable when acted upon by the power from the drive device while being rotatably supported on the base block;
a speed reducing mechanism unit for reducing a speed of the rotation of the input rotating body; and
an output rotating body rotatable when acted upon by speed-reduced power from the speed reducing mechanism unit; and
an idler gear rotatable in a meshing manner with a gear provided on the input rotating body; and
a rotation detector device for detecting a rotational state of a gear shaft of the idler gear.

(4-4) A steering assisting device including:
a drive device for outputting rotational power;
a speed reducer for receiving power from the drive device and reducing a speed of input rotation; and
a steering mechanism operable when acted upon by speed-reduced power from the speed reducer,
wherein the speed reducer includes:
a base block;
an input rotating body rotatable when acted upon by the power from the drive device while being rotatably supported on the base block;
a speed reducing mechanism unit for reducing a speed of the rotation of the input rotating body; and
an output rotating body rotatable when acted upon by speed-reduced power from the speed reducing mechanism unit; and
an idler gear rotatable in a meshing manner with a gear provided on the input rotating body; and
a rotation detector device for detecting a rotational state of a gear shaft of the idler gear.

The present invention is not limited to the above-described embodiments and can be modified in a variety of designs without deviating from the spirit of the present invention.

INDUSTRIAL APPLICABILITY

The present disclosure can achieve a reduced number of parts and a shortened axial length for speed reducers. Accordingly, the present disclosure is industrially applicable.

What is claimed is:

1. A speed reducer comprising:
an input rotating body rotatable when acted upon by power from a drive device;
a base block supporting the input rotating body rotatably;
a speed reducing mechanism unit for reducing a speed of rotation of the input rotating body; and
a tubular case externally covering the speed reducing mechanism unit and the base block, the tubular case being assembled onto the base block such that the tubular case and the base block are rotatable relative to each other, the tubular case having axial ends,
wherein the speed-reduced rotation from the speed reducing mechanism unit is output from one of the tubular case and the base block,
wherein the base block has a fixture flange integrally formed therewith, and the flange extends from a radially inner region within the tubular case radially outward beyond an outer peripheral surface of the tubular case,
wherein the base block has an annular groove open axially, and the annular groove is positioned between a substrate portion radially inside the tubular case and the fixture flange, and
wherein the annular groove houses one of the axial ends of the tubular case therein.

2. The speed reducer of claim 1, wherein a sealing member is disposed between an inner peripheral surface of the annular groove and an outer peripheral surface of the tubular case for providing sealing between the base block and the tubular case.

3. A drive unit comprising:
a drive device for outputting rotational power; and
a speed reducer for receiving power from the drive device and reducing a speed of input rotation,
wherein the speed reducer includes:
an input rotating body rotatable when acted upon by the power from the drive device;
a base block supporting the input rotating body rotatably;
a speed reducing mechanism unit for reducing a speed of rotation of the input rotating body; and
a tubular case externally covering the speed reducing mechanism unit and the base block, the tubular case being assembled onto the base block such that the tubular case and the base block are rotatable relative to each other, the tubular case having axial ends,
wherein the speed-reduced rotation from the speed reducing mechanism unit is output from one of the tubular case and the base block,
wherein the base block has a fixture flange integrally formed therewith, and the flange extends from a radially inner region within the tubular case radially outward beyond an outer peripheral surface of the tubular case,
wherein the base block has an annular groove open axially, and the annular groove is positioned between a substrate portion radially inside the tubular case and the fixture flange, and
wherein the annular groove houses one of the axial ends of the tubular case therein.

4. The drive unit of claim 3, wherein a sealing member is disposed between an inner peripheral surface of the annular groove and an outer peripheral surface of the tubular case for providing sealing between the base block and the tubular case.

5. A steering assisting device comprising:
a drive device for outputting rotational power;
a speed reducer for receiving power from the drive device and reducing a speed of input rotation; and
a steering mechanism operable when acted upon by speed-reduced power from the speed reducer,
wherein the speed reducer includes:
an input rotating body rotatable when acted upon by the power from the drive device;
a base block supporting the input rotating body rotatably;
a speed reducing mechanism unit for reducing a speed of the rotation of the input rotating body; and
a tubular case externally covering the speed reducing mechanism unit and the base block, the tubular case being assembled onto the base block such that the tubular case and the base block are rotatable relative to each other, the tubular case having axial ends,
wherein the speed-reduced rotation from the speed reducing mechanism unit is output from one of the tubular case and the base block,
wherein the base block has a fixture flange integrally formed therewith, and the flange extends from a radially inner region within the tubular case radially outward beyond an outer peripheral surface of the tubular case,
wherein the base block has an annular groove open axially, and the annular groove is positioned between a substrate portion radially inside the tubular case and the fixture flange, and
wherein the annular groove houses one of the axial ends of the tubular case therein.

6. The steering assisting device of claim 5, wherein a sealing member is disposed between an inner peripheral surface of the annular groove and an outer peripheral surface of the tubular case for providing sealing between the base block and the tubular case.

* * * * *